March 10, 1959  A. E. R. ARNOT  2,877,071
SEALS FOR PISTONS, GLANDS AND THE LIKE
Filed Oct. 23, 1957
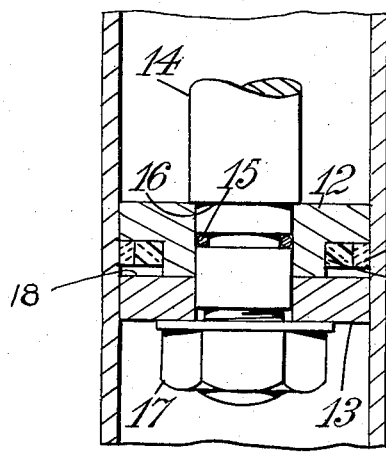
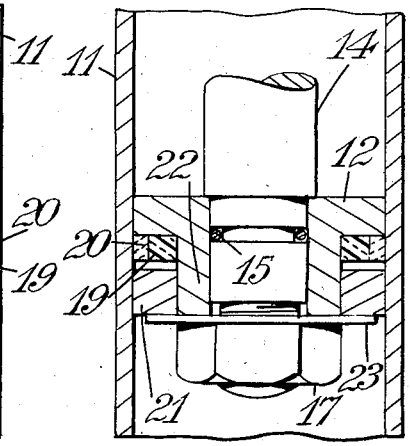
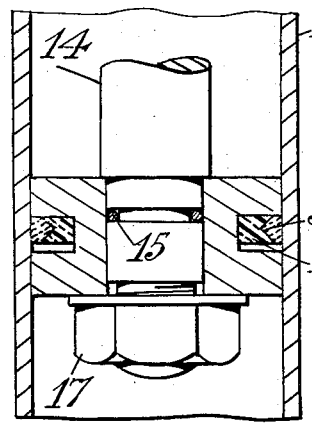
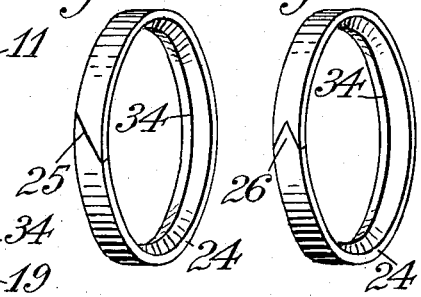
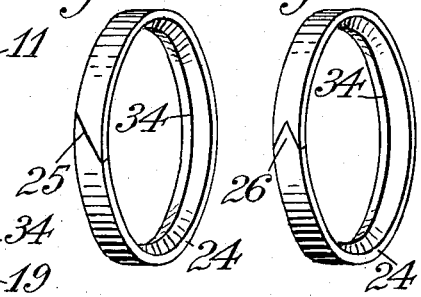
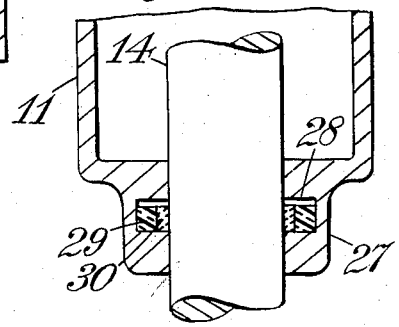
Inventor:
Alfred E. R. Arnot
By Watson, Cole, Grindle & Watson
Attorneys

United States Patent Office 2,877,071
Patented Mar. 10, 1959

2,877,071

SEALS FOR PISTONS, GLANDS AND THE LIKE

Alfred Erwin Reginald Arnot, Basingstoke, England, assignor to Emmanuel Kaye and John Reginald Sharp, Basingstoke, England Application October 23, 1957, Serial No. 691,837

Claims priority, application Great Britain October 23, 1956

6 Claims. (Cl. 309—23)

This invention comprises improvements in or relating to seals for pistons, glands and the like.

It is an object of this invention to provide a sealing ring of the compound type which not only affords a good seal but has less friction and better wearing properties than seals of this kind hitherto employed.

It is well known to seal a piston to the walls of a cylinder by providing, in a groove round the piston a rectangular ring of rubber which is narrower than the width of the groove and is compound; that is to say, it consists of an inner ring of soft rubber and an outer ring of harder and more wear-resistant rubber, which latter bears against the cylinder wall, affords the seal and takes the wear, while the inner ring, by its ready deformation under pressure, is compressed axially by the fluid, leakage of which is to be prevented, and expands radially, forcing the outer harder ring against the cylinder wall with a pressure proportional to the fluid pressure. Such rings are extremely effective but have a somewhat high frictional drag.

According to the present invention, a seal for a piston or gland or the like comprises two concentric rings, one of rubber or like resilient material to fit into the base of a groove in one of the parts to be sealed and the other of a thermoplastic resilient polymer such as poly-tetra-fluoro-ethylene a polyamide in contact with the first and with the surface of the other part to be sealed. Poly-tetra-fluoro-ethylene is commonly known as "fluon" and is found to be hard enough for the purpose and to cooperate with the soft rubber ring in the same way as the hard rubber, but it has a much lower coefficient of friction against metal, and the resultant seals have a lower frictional drag with greater efficiency and longer life than the known seals.

In using the fluon outer rings, the radial dimensions of the inner soft rubber ring should be greater than in the known seals. Also, owing to the resistance of the fluon to stretch, the difficulty of assembly has to be overcome. To this end, either the piston, ram or the like which is to be sealed can be divided in the plane of the groove and the two parts thereof assembled with the compound ring between them, or the fluon ring can be cut with a scarfed or like division which closes up when in place. The softer rubber ring can in normal cases be stretched over the edge of the groove in which it is to work.

Instead of dividing the piston in the plane of the groove which receives the fluon ring, the piston may be shouldered, having a portion of reduced diameter from the groove as far as one face of the piston, and a removable sleeve may be fitted over the reduced portion. Removing the sleeve permits the fluon ring to be fitted and when the sleeve is replaced the ring is held in place.

The following is a description, by way of example, of certain constructions in accordance with the invention, reference being made to the accompanying drawing, in which:

Figure 1 is a longitudinal section through part of a cylinder, showing a piston therein with one construction of sealing means;

Figure 2 is a similar view of a second construction;

Figure 3 is a similar view of a third construction;

Figure 4 is a perspective view of a fluon ring for use in the construction of Figure 3;

Figure 5 is a perspective view of a second form of fluon ring; and

Figure 6 is a longitudinal section through a gland.

Referring to Figure 1, the cylinder 11 contains a piston formed of two discs 12, 13, on a rod 14. The discs are centred on the piston rod 14. The piston rod 14 is shouldered at 16 to enter the discs and carries a screw-threaded end which receives a nut 17 to hold the parts together.

Between the discs 12, 13 is an annular groove 18 in which is a soft-rubber ring 19 surrounded by a fluon ring 20.

The fluon ring 20 needs to be externally of the size of the cylinder in which it works, so that it is not in substantial tension or compression when assembled. It may be made either by cutting from tubular material of the correct diameter, or by cutting from sheet, or by taking strip material of the same cross-section as the desired ring, cutting it into lengths, and rolling to form the ring. The material used may be pure poly-tetra-fluoro-ethylene, or any composition in which it is so blended as to afford the characteristic properties of this material.

The sub-division of the piston shown in Figure 1 into two parts enables the rings 19, 20 to be readily assembled in place. Figure 2 shows an alternative construction comprising cylinder 11, piston 12 and rod 14, but the disc 13 is replaced by a ring 21 which fits firmly over a cylindrical reduced portion 22 of the piston 12, which is of the same diameter as the base of the groove in which the rubber or fluon rings 19, 20 operate. The ring 21 is held on by the edge of a washer 23 between itself and nut 17.

In Figure 3 the main parts are as before, but the fluon ring 24 is split as shown in Figure 4 at 25 with a scarf on each part at the junction. This junction, which is not united by any adhesive but is left free, enables the ring to be sprung into place over the piston 12, which is solid.

Figure 5 shows a ring 24 with an alternative form of scarfing at 26, intended to be used in a construction such as that of Figure 3.

In the forms shown in Figures 3 to 5 inclusive, the inner part of the fluon ring 24 is made with a ridge to enter a depression in the exterior of the rubber ring 19.

Figure 6 shows a gland at 27 to a cylinder 11, to seal a rod 14. The gland has an internal groove 28 which contains a rubber ring 29 and within it a fluon ring 30 which bears on the rod 14.

Instead of using fluon, a hard polyamide such as "nylon" can be used, and other polymeric materials which are resilient and hard enough and are not liable to be softened by chemical action of the fluid in connection with which the seal is employed, can be used.

I claim:

1. A seal for pistons, glands and the like comprising two concentric flat-sided rings of equal axial width, one of rubber or like resilient material to fit into the base of a groove in one of the parts to be sealed and the other of a thermoplastic resilient polymer in contact with the first and with the surface of the other part to be sealed, the rings being narrower in an axial direction than said groove.

2. A seal as claimed in claim 1, wherein the polymeric ring is scarf-jointed to facilitate assembly.

3. A seal for pistons, glands and the like comprising two concentric flat-sided rings of equal axial width, one of rubber or like resilient material to fit into the base of a groove in one of the parts to be sealed and the other of poly-tetra-fluoro-ethylene in contact with the first and with the surface of the other part to be sealed, the rings being narrower in an axial direction than said groove.

4. A piston for use in a cylinder comprising a groove in which is located a compound sealing ring, namely an inner flat-sided ring of soft resilient material such as rubber and an outer flat-sided ring of nylon of the same axial width as the inner ring to fit the cylinder in which the piston works but both rings being narrower axially than said groove, one wall of the groove being formed in a member which is part of the piston and is removable to permit the nylon ring to be assembled in place.

5. A piston for use in a cylinder comprising a groove in which is located a compound sealing ring, namely an inner flat-sided ring of soft resilient material such as rubber and outer ring of polytetrafluoroethylene of axial width equal to said soft ring and of external diameter to fit the cylinder in which the piston works of poly-tetra-fluoro-ethylene, both said rings being narrower axially than said groove, one wall of the groove being formed in a member which is part of the piston and is removable to permit the poly-tetra-fluoro-ethylene ring to be assembled in place.

6. A seal as claimed in claim 2 wherein the part of the polymeric ring which is in contact with the first said ring is made ridge-shaped in cross section and the first said ring has a depression to receive it.

References Cited in the file of this patent

UNITED STATES PATENTS 2,784,013     Groen _____ Mar. 5, 1957